(12) United States Patent
Guo

(10) Patent No.: US 9,243,171 B2
(45) Date of Patent: Jan. 26, 2016

(54) PRESSURE SENSITIVE ADHESIVE COMPOSITIONS

(71) Applicant: Momentive Specialty Chemicals Inc., Columbus, OH (US)

(72) Inventor: Jong S. Guo, Charlotte, NC (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 14/082,776

(22) Filed: Nov. 18, 2013

(65) Prior Publication Data

US 2014/0142238 A1    May 22, 2014

Related U.S. Application Data

(60) Provisional application No. 61/727,977, filed on Nov. 19, 2012.

(51) Int. Cl.
*C09J 7/02* (2006.01)
*C09J 133/08* (2006.01)

(52) U.S. Cl.
CPC ..................................... *C09J 133/08* (2013.01)

(58) Field of Classification Search
CPC ...... C09J 133/04; C09J 133/06; C09J 133/08; C09J 133/10; C09J 133/14; C09J 133/18; C09J 133/20; C09J 133/22; C09J 133/24; C09J 133/26; C09J 135/00; C09J 135/02; C09J 135/04
See application file for complete search history.

(56) References Cited

U.S. PATENT DOCUMENTS

| 3,919,153 | A | * | 11/1975 | Fischer | 524/512 |
| 4,879,333 | A | | 11/1989 | Frazee | |
| 5,049,608 | A | * | 9/1991 | Medina | 524/375 |
| 5,486,426 | A | * | 1/1996 | McGee et al. | 428/516 |
| 2005/0217789 | A1 | * | 10/2005 | Eckstein et al. | 156/244.11 |
| 2010/0062204 | A1 | * | 3/2010 | Tanaka et al. | 428/66.6 |
| 2010/0093930 | A1 | | 4/2010 | Guo et al. | |
| 2011/0027345 | A1 | * | 2/2011 | Wang et al. | 424/448 |
| 2013/0202885 | A1 | * | 8/2013 | Dodge et al. | 428/355 AC |
| 2013/0211028 | A1 | * | 8/2013 | Shinike et al. | 526/307.5 |
| 2014/0077139 | A1 | * | 3/2014 | Amino et al. | 252/586 |

FOREIGN PATENT DOCUMENTS

| EP | 0523723 B1 | 11/1997 |
| WO | WO 2013/119404 A1 | 8/2013 |

* cited by examiner

*Primary Examiner* — Vu A Nguyen

(57) ABSTRACT

Disclosed are pressure sensitive adhesive compositions having enhanced water resistance and adhesion properties, which compositions include 70-99 wt % of an acrylic polymer dispersion and 1-30 wt % of a polyolefin dispersion. The acrylic polymer dispersion includes (1) one or more acrylic acid ester or (meth)acrylate acid ester(s), (2) one or more hydrocarbon monomer(s), (3) one or more ethylenically unsaturated carboxylic acid(s), (4) one or more nitrile(s) or amide(s) of an ethylenically unsaturated carboxylic acid(s), (5) one or more vinyl ester(s) of a carboxylic acid(s), optionally (6) one or more nitrogen containing acetoacetoxy functional compound(s), and optionally (7) one or more mercaptan chain transfer agent(s), and the polyolefin dispersion includes one or more polyolefins, which may or may not contain acid functionality.

18 Claims, No Drawings

PRESSURE SENSITIVE ADHESIVE COMPOSITIONS

FIELD OF THE INVENTION

The present invention relates to pressure sensitive adhesives (PSAs) having enhanced water resistance and adhesion properties. Specifically, the present invention relates to acrylic emulsion PSAs having enhanced shear strength while maintaining good adhesion to low energy surfaces, such as polyethylene or polypropylene, without the use of a tackifier dispersion.

BACKGROUND OF THE INVENTION

Acrylic PSAs are utilized in many applications for bonding a flexible material to a surface, and are used, for example, in the tape and label industry due to their high solids content, low volatile organic content, good UV/thermal stability, and high coating speed. Traditional acrylic emulsions incorporate tackifier dispersions to enhance their adhesion to low energy surfaces. However, use of such tackifiers has the disadvantages of poor water resistance, yellowing, and decreased cohesive strength.

Acrylic PSAs are typically produced by emulsion or solution polymerization, with emulsion polymerization being preferred. The adhesion properties of acrylic emulsion PSAs are influenced by the type and relative amounts of the monomers employed in the polymerization process.

Accordingly, there is a need for acrylic emulsion PSAs having enhanced shear strength while maintaining good adhesion to low energy surfaces, such as polyethylene or polypropylene, without the use of a tackifier dispersion.

SUMMARY OF THE INVENTION

In one embodiment, there is provided a pressure sensitive adhesive composition which includes about 70-99 wt % of an acrylic polymer dispersion and about 1-30 wt % of a polyolefin dispersion, with the wt % being based on the weight of the composition, where the acrylic polymer dispersion contains (1) one or more acrylic acid ester or (meth)acrylate acid ester(s), (2) one or more hydrocarbon monomer(s), (3) one or more ethylenically unsaturated carboxylic acid(s), (4) one or more nitrile(s) or amide(s) of an ethylenically unsaturated carboxylic acid(s), (5) one or more vinyl ester(s) of a carboxylic acid(s), optionally (6) one or more nitrogen containing acetoacetoxy functional compound(s), and optionally (7) one or more mercaptan chain transfer agent(s), and where the polyolefin dispersion contains one or more polyolefins, which may or may not include acid functionality.

In another embodiment there is provided a pressure sensitive adhesive composition which includes about 70-99 wt % of an acrylic polymer dispersion and about 1-30 wt % of a polyolefin dispersion, with the wt % being based on the weight of the composition, where the acrylic polymer dispersion contains (1) about 75 to about 95 wt % of one or more $C_1$-$C_{17}$ alkyl acrylates or alkyl methacrylates selected from methyl acrylate, methyl methacrylate, ethyl acrylate, ethyl methacrylate, isopropyl acrylate, isopropyl methacrylate, n-butyl acrylate, n-butyl methacrylate, i-butyl acrylate, i-butyl methacrylate, t-butyl acrylate, t-butyl methacrylate, hexyl acrylate, hexyl methacrylate ethylhexyl acrylate, ethylhexyl methacrylate, 3,3 dimethylbutyl methacrylate, lauryl acrylate, and combinations or subsets thereof, (2) about 5 to about 10 wt % of one or more hydrocarbon monomer(s) selected from styrene, carboxylated styrene, and alpha-methyl styrene, ethylene, propylene, butylene, conjugated diener (e.g., butadiene, isoprene and copolymers of butadiene and isoprene), and combinations or subsets thereof, (3) about 0.5 to about 3 wt % of one or more ethylenically unsaturated carboxylic acid(s) selected from acrylic acid, methacrylic acid, ethacrylic acid, crotonic acid, carboxyethyl acrylate, maleic acid, fumaric acid, itaconic acid, citraconic acid, aconitic acid, their halogen substituted derivatives (e.g., alphachloracylic acid), and the anhydrides of these acids (e.g., maleic anhydride and citraconic anhydride), and combinations or subsets thereof, (4) about 0.5 to about 5 wt % of one or more nitrile(s) of ethylenically unsaturated carboxylic acid(s) selected from acrylonitrile, alpha chloroacrylonitrile, methacrylonitrile, and combinations or subsets thereof, (5) about 0.5 to about 20 wt % of one or more vinyl ester(s) of a $C_2$-$C_{12}$ carboxylic acid(s), and combinations or subsets therefor, optionally (6) 0 to about 5 wt % of one or more nitrogen containing acetoacetoxy functional compound(s), and optionally (7) 0 to about 0.5 wt % of one or more mercaptan chain transfer agent(s), where the wt % is based on the total weight of components 1-5, and where the polyolefin dispersion contains one or more polyolefins, which may or may not include acid functionality.

In another embodiment there is provided a pressure sensitive adhesive composition which includes 70-99 wt % of an acrylic polymer dispersion and 1-30 wt % of a polyolefin dispersion, with the wt % being based on the weight of the composition, where the acrylic polymer dispersion contains (1) about 75 to about 95 wt % of a combination of methyl methacrylate, ethyl acrylate, and ethylhexyl acrylate, (2) about 5 to about 10 wt % of styrene monomer (3) about 0.5 to about 3 wt % of a combination of acrylic acid and carboxyethyl acrylate, (4) about 0.5 to about 5 wt % of acrylonitrile, (5) about 0.5 to about 20 wt % of one or more vinyl ester(s) of a $C_9$ or $C_{10}$ carboxylic acid(s), optionally (6) 0 to about 5 wt % of one or more nitrogen containing acetoacetoxy functional compound(s), and optionally (7) 0 to about 0.5 wt % of one or more mercaptan chain transfer agent(s), where the wt % is based on the total weight of components 1-5, and where the polyolefin dispersion contains one or more polyolefins with acid functionality such as an ethylene acrylic acid copolymer or a propylene acrylic acid copolymer.

In another embodiment, there is provided a method of preparing a pressure sensitive adhesive composition which includes the steps of combining about 70-99 wt % of an acrylic polymer dispersion and with about 1-30 wt % of a polyolefin dispersion, with the wt % being based on the weight of the composition. In the method, the acrylic polymer dispersion contains (1) one or more acrylic acid ester or (meth)acrylate acid ester(s), (2) one or more hydrocarbon monomer(s), (3) one or more ethylenically unsaturated carboxylic acid(s), (4) one or more nitrile(s) or amide(s) of an ethylenically unsaturated carboxylic acid(s), (5) one or more vinyl ester(s) of a carboxylic acid(s), optionally (6) one or more nitrogen containing acetoacetoxy functional compound(s), and optionally (7) one or more mercaptan chain transfer agent(s), and the polyolefin dispersion contains one or more polyolefins, which may or may not include acid functionality.

DETAILED DESCRIPTION OF THE INVENTION

The present invention provides PSA compositions. Specifically, the present invention relates to PSA compositions containing 70-99 wt % of an acrylic polymer dispersion and 1-30 wt % of a polyolefin dispersion containing one or more polyolefins, which may or may not include acid functionality, with the wt % being based on the weight of the composition.

Acrylic Polymer Dispersion

The PSA composition of the invention includes 70-99 wt % of an acrylic polymer dispersion which contains (1) one or more acrylic acid ester or (meth)acrylate acid ester(s), (2) one or more hydrocarbon monomer(s), (3) one or more ethylenically unsaturated carboxylic acid(s), (4) one or more nitriles or amides of an ethylenically unsaturated carboxylic acid(s), (5) one or more vinyl ester(s) of a carboxylic acid(s), optionally (6) one or more nitrogen containing acetoacetoxy functional compound(s), and optionally (7) one or more mercaptan chain transfer agent(s).

(1) Examples of acrylic acid esters or methacrylate acid esters suitable for use in the present invention include $C_1$-$C_{17}$ alkyl acrylates or alkyl methacrylates. Typical examples include methyl acrylate, methyl methacrylate, ethyl acrylate, ethyl methacrylate, isopropyl acrylate, isopropyl methacrylate, n-butyl acrylate, n-butyl methacrylate, i-butyl acrylate, i-butyl methacrylate, t-butyl acrylate, t-butyl methacrylate, hexyl acrylate, hexyl methacrylate ethylhexyl acrylate, ethylhexyl methacrylate, 3,3 dimethylbutyl methacrylate, lauryl acrylate and any combination or subset thereof.

The PSA composition of the invention may comprise about 75 to about 95 wt % acrylic acid esters or (meth)acrylate acid esters, based on the weight of components 1-5.

(2) Examples of hydrocarbon monomers suitable for use in the present invention include styrene compounds (e.g., styrene, carboxylated styrene, and alpha-methyl styrene), ethylene, propylene, butylene, and conjugated dienes (e.g., butadiene, isoprene and copolymers of butadiene and isoprene) and any combination or subset thereof.

The PSA composition of the invention may comprise about 5 to about 10 wt % hydrocarbon monomers, based on the weight of components 1-5.

(3) Examples of ethylenically unsaturated carboxylic acid(s) include monoethylenically unsaturated monocarboxylic acids such as acrylic acid, methacrylic acid, ethacrylic acid, crotonic acid, and carboxyethyl acrylate, monoethylenically unsaturated dicarboxylic acids such as maleic acid, fumaric acid, itaconic acid, and citraconic acid, monoethylenically unsaturated tricarboxylic acids such as aconitic acid, and the halogen substituted derivatives (e.g., alphachloracylic acid) and anhydrides of these acids (e.g., maleic anhydride and citraconic anhydride).

The PSA composition of the invention may comprise about 0.5 to about 3 wt % monoethylenically unsaturated carboxylic acids, based on the weight of components 1-5.

(4) Examples of nitriles of the above ethylenically unsaturated carboxylic acids include acrylonitrile, alpha chloroacrylonitrile, and methacrylonitrile. Examples of amides of these carboxylic acids include unsubstituted amides such as (meth)acrylamide and other alpha substituted acrylamides and n-substituted amides obtained by the reaction of the amides of the aforementioned carboxylic acids with an aldehyde (e.g., formaldehyde). Typical n-substituted amides include n-methylolacrylamide, n-methylolmethacrylamide alkylated n-methylolacrylamides, and n-methylolmethacrylamides (e.g., n-methoxymethylacrylamide and n-methoxymethylmethacrylamide).

The PSA composition of the invention may comprise about 0.5 to about 5wt % nitriles and/or amides of monoethylenically unsaturated carboxylic acids, based on the weight of components 1-5.

(5) Examples of vinyl esters of carboxylic acids suitable for use in the invention include a vinyl ester of a $C_2$-$C_{12}$ carboxylic acid, for example VeoVa™ 9 vinyl ester, or VeoVa™ 10 vinyl ester of a carboxylic acid, both commercially available from Momentive Specialty Chemicals Inc.

The PSA composition of the invention may comprise about 0.5 to about 6wt % vinyl ester of a carboxylic acid, based on the weight of components 1-5.

(6) When utilized, examples of the optional nitrogen containing acetoacetoxy functional compounds suitable for use in the present invention include one or more of t-butylaminoethyl methacrylate, dimethylaminoethyl methacrylate, diethyl-5 aminoethyl methacrylate, N,N-dimethylaminopropyl methacrylamide, 2-t-butylaminoethyl methacrylate, N,N-dimethylaminoethyl acrylate, N-(2-methacrylamido-ethyl) ethylene urea, and N-(2-methacryloyloxyethyl)ethylene urea. N-(2-methacryloyloxyethyl)ethylene urea is available from Evonik Cyro LLC as a 25% solution in methylmethacrylate under the trade name Rohamere 6844-O.

When utilized, the PSA composition of the invention may comprise about 0.5 to about 5 wt % nitrogen containing acetoacetoxy functional compounds, based on the weight of components 1-5.

(7) When utilized, examples of the optional alkyl mercaptan chain transfer agents suitable for use in the invention include $C_6$-$C_{18}$ alkyl mercaptan for example n-hexyl mercaptan, n-octyl mercaptan and n-dodecyl mercaptan.

When utilized, the PSA composition of the invention may comprise about 0.05 to about 0.5 wt % mercaptan chain transfer agents, based on the weight of components 1-5.

In another embodiment the pressure sensitive adhesive compositions of the invention are essentially free of a tackifies.

In another embodiment of the invention, the dispersions also include a continuous phase (usually water), and may include other components standard and known in the art such as surfactants and the like.

Polyolefin Dispersion

The PSA composition of the invention includes 1-30 wt % of a polyolefin dispersion which contains one or more polyolefins, such as polyethylene or polypropylene. In one embodiment, the polyolefin may contain acid functionality such as, for example, an ethylene acrylic acid copolymer or a propylene acrylic acid copolymer.

In one embodiment, polyolefin dispersion comprises an ethythene acrylic acid copolymer, such as Michem® Prime 4990R commercially available from Michelman, Inc.

In order to provide a better understanding of the present invention including representative advantages thereof, the following examples are offered.

EXAMPLES

Compositions of acrylic polymer dispersions and of comparative acrylic polymer dispersions are set forth in Table 1.

TABLE 1

| | Acrylic Polymer Dispersion Components | | | | | |
|---|---|---|---|---|---|---|
| Component | Ex. 1 wt % | Comp. 1 wt % | Comp. 2 wt % | Comp. 3 wt % | Ex. 2 wt % | Ex. 3 wt % |
| Vinyl ester of neodecanoic acid | 3.0 | 3.0 | 0.0 | 0.0 | 3.0 | 15.0 |
| Styrene | 7.0 | 7.0 | 7.0 | 7.0 | 7.0 | 7.0 |
| Ethyl Acrylate | 7.0 | 7.0 | 10.0 | 10.0 | 7.0 | 7.0 |

TABLE 1-continued

Acrylic Polymer Dispersion Components

| Component | Ex. 1 wt % | Comp. 1 wt % | Comp. 2 wt % | Comp. 3 wt % | Ex. 2 wt % | Ex. 3 wt % |
|---|---|---|---|---|---|---|
| 2-Ethylhexyl Acrylate | 76.0 | 78.0 | 78.0 | 78.0 | 75.0 | 64.0 |
| Acrylonitrile | 2.0 | 0.0 | 0.0 | 0.0 | 3.0 | 2.0 |
| Methyl Methacrylate | 3.0 | 3.0 | 3.5 | 3.5 | 3.0 | 3.0 |
| Sipomer B-CEA[1] | 0.5 | 0.5 | 0.5 | 0.5 | 0.5 | 0.5 |
| Acrylic Acid | 1.5 | 1.5 | 1.0 | 1.0 | 1.5 | 1.5 |
| N-(2-methacryloyloxyethyl) ethylene urea | 0.9 | 0.5 | 0.0 | 0.9 | 0.9 | 0.9 |
| N-Dodecyl Mercaptan | 0.09 | 0.12 | 0.0 | 0.09 | 0.09 | 0.09 |

[1]Sipomer B-CEA is beta-carboxyethyl acrylate (mixture of acrylic acid oligomers) available from Rhodia.

Comparative Example 1

To prepare the PSA latex compositions, a pre-emulsion was formed by mixing 242.3 g water, 45.9 g ammonium salt of Poly(oxy-1,2-ethanediyl),alpha-sulfo-omega-[1-(hydroxymethyl)-2-(2-propenyloxy) ethoxy]-,C11-rich C10-14-branched alkyl ethers, 4.6 g aliphatic ethoxylate nonionic surfactant (50% active), 53.6 g styrene, 53.6 g ethyl acrylate, 23.0 g vinyl ester of neodecanoic acid, 597.0 g 2-ethylhexyl acrylate, 25.8 g methyl methacrylate, 3.8 g Sipomer B-CEA (available from Rhodia), 11.5 g acrylic acid, 0.95 g N-(2-methacryloyloxyethyl) ethylene urea, and 0.92 g n-dodecyl mercaptan. Two separate solutions were prepared: (A) 2.3 g sodium persulfate in 55.1 g water and (B) 1.53 g sodium persulfate in 13.8 g water. 257.8 g water and 1.5 g SR-3025 surfactant, commercially available from Adeka Corporation, were charged to the reactor. Nitrogen purge was started and heating to 78° C. took place. At 78° C., 32 g of the pre-emulsion was added to the reactor. Solution B was charged to the kettle and flushed with 3 g water. Nitrogen purge was turned off, and the reaction exotherm began. 15 minutes after the exotherm peaked, the mixture from pre-emulsion tank and solution A were allowed to flow into the reactor for 4 hours and the reactor temperature was controlled at 85° C. After the flow was complete, the pre-emulsion was flushed with 15 g water and the reactor held at 87° C. for 45 minutes then cooled. Solution (C) 2.2 g t-butyl hydroperoxide in 22.7 g water and (D) 1.5 g sodium formaldehyde sulfoxylate in 23.3 g water were prepared. At 60° C., 2.5 g of 28% aqueous ammonia solution was added to reactor. Flow of solution C and D to reactor over 60 minutes was started, and the reactor held for another 15 minutes. The reactor was cooled to room temperature and the pH adjusted to 6-8 with 28% aqueous ammonia solution. 75 g of Michem Prime 4990R was then added to the kettle.

Example 1

Same as Comparative example 1 except the monomer mixture is changed to 53.6 g styrene, 53.6 g ethyl acrylate, 581.7 g 2-ethylhexyl acrylate, 28.2 g methyl methacrylate, 15.3 g acrylonitrile, 23.0 g the vinyl ester of neodecanoic acid, 3.8 g Sipomer B-CEA, 11.5 g acrylic acid 1.7 g N-(2-methacryloyloxyethyl) ethylene urea, and 0.69 g n-dodecyl mercaptan. 75 g of Michem Prime 4990R was then added to the kettle.

The samples were tested by coating onto 2-mil PET film and drying at 110° C. for 5 minutes with a target dried adhesive coat weight of 21 g/m2. The coated PET was laminated to release liner. The PET/adhesive/liner construction was cut into 1-inch wide stripes, the release liner was removed, and the PET film with adhesive was laminated to stainless steel (SS) and high density polyethylene substrates (HDPE) for peel testing with 15-minute and 24-hour and 7-day dwell time. The shear of adhesive is determined by applying 4-lb weight at the bottom of a 2.54 cm by 2.54 cm strip adhered to a steel panel. The steel panel with the coated strips attached is held in a rack such that the panel forms an angle of 178° to 180°. The time, in hours, required to total failure of the test strip at 23° C. was recorded as the shear strength. Results are shown Table 2 below:

TABLE 2

Performance Comparison

| | Example 1 | Comparative |
|---|---|---|
| PL15 SS (lbs/in) | 3.27 | 3.50 |
| PL24 SS (lbs/in) | 6.68 | 3.96 |
| PL1W SS (lbs/in) | 6.5 | 4.44 |
| PL15 HDPE (lbs/in) | 1.32 | 1.87 |
| PL24 HDPE (lbs/in) | 1.53 | 3.84 |
| PL1W HDPE (lbs/in) | 1.96 | 4.38 |
| shear (1 × 1 × 4 lbs) hrs | 38.3 | 9.0 |

Comparative 2

A pre-emulsion was formed by mixing 242.3 g water, 25.0 g sodium dodecyl diphenyl ether disulfonate (46% active), 4.6 g aliphatic ethoxylate nonionic surfactant (50% active), 53.6 g styrene, 76.6 g ethyl acrylate, 597.0 g 2-ethylhexyl acrylate, 27.0 g methyl methacrylate, 3.8 g Sipomer B-CEA, and 7.5 g acrylic acid. Two separate solutions were prepared: (A) 2.3 g sodium persulfate in 55.1 g water and (B) 1.53 g sodium persulfate in 13.8 g water. 257.8 g water was charged to the reactor. Nitrogen purge was started and heating to 78° C. took place. At 78° C., 32 g of the pre-emulsion was added to the reactor. Solution B was charged to the kettle and flushed with 3 g water. Nitrogen purge was turned off, and the reaction exotherm began. 15 minutes after the exotherm peaked, the mixture from pre-emulsion tank and solution A were allowed to flow into the reactor for 4 hours and the reactor temperature was controlled at 85° C. After the flow was complete, the pre-emulsion was flushed with 15 g water and the reactor held at 87° C. for 45 minutes then cooled. Solution (C) 2.2 g t-butyl hydroperoxide in 22.7 g water and (D) 1.5 g sodium formaldehyde sulfoxylate in 23.3 g water were prepared. At 60° C., 2.5 g of 28% aqueous ammonia solution was added to reactor. Flow of solution C and D to reactor over 60 minutes was started, and the reactor held for another 15 minutes. The reactor was cooled to room temperature and the pH adjusted to 6-8 with 28% aqueous ammonia solution. Comparative example 2a: 3 g sodium dioctyl sulfosuccinate and 15 g of Michem Prime 4990R were added under mixing to 300 g of the comparative example 2. Comparative example 2b: 3 g sodium dioctyl sulfosuccinate was added under mixing to 300 g of the comparative example 2.

Comparative Example 3

Same as Comparative example 1 except the monomer mixture is changed to 53.6 g styrene, 76.6 g ethyl acrylate, 597.0 g 2-ethylhexyl acrylate, 32.2 g methyl methacrylate, 3.8 g Sipomer B-CEA, 7.5 g acrylic acid 1.7 g N-(2-methacryloyloxyethyl) ethylene urea, and 0.69 g n-dodecyl mercaptan.

peel testing with 15-minute and 24-hour dwell time. The shear of adhesive is determined by applying 500-gram weight at the bottom of a 1.27 cm by 1.27 cm strip adhered to a steel panel. The steel panel with the coated strips attached is held in a rack such that the panel forms an angle of 178° to 180°. The time, in hours, required to total failure of the test strip at 23° C. was recorded as the shear strength. Two commercially available acrylic emulsion PSA from Momentive, Synthebond E-2050 and 7701, were also included in the testing for comparison. Both products do not contain acrylonitrile, vinyl ester of neodecanoic acid, or polyolefin dispersion. The introduction of Acrylonitrile and vinyl ester of neodecanoic acid combining with polyolefin dispersion helps to increase the adhesion to HDPE and cohesive strength. The performance is set forth in Table 3 below.

TABLE 3

Performance Comparison

|  | Comp. 2a | Comp. 2b | Comp. 3a | Comp. 3b | Ex. 2a | Ex. 2b | Ex. 3a | Synthebond E-2050 | Synthebond 7701 |
|---|---|---|---|---|---|---|---|---|---|
| PL15 SS (lbs/in) | 3.90 | 4.32 | 3.40 | 3.05 | 2.55 | 2.93 | 2.06 | 1.09 | 1.98 |
| PL24 SS (lbs/in) | 3.62 | 3.48 | 5.88 | 5.34 | 4.77 | 7.31 | 3.59 | 2.39 | 4.26 |
| PL15 HDPE (lbs/in) | 3.96 | 4.31 | 5.19 | 5.38 | 3.65 | 1.68 | 1.73 | 0.33 | 1.00 |
| PL24 HDPE (lbs/in) | 3.80 | 2.67 | 5.40 | 5.41 | 3.23 | 3.31 | 2.40 | 0.56 | 1.14 |
| shear (hrs) | 0.1 | 0.1 | 8.2 | 8.3 | 30.1 | 21.6 | 18.4 | 4.7 | >100 |

Comparative example 3a: 3 g sodium dioctyl sulfosuccinate and 15 g of Michem Prime 4990R were added under mixing to 300 g of the comparative example 3. Comparative example 3b: 3 g sodium dioctyl sulfosuccinate was added under mixing to 300 g of the comparative example 3.

Example 2

Same as Comparative example 1 except the monomer mixture is changed to 53.6 g styrene, 53.6 g ethyl acrylate, 574.0 g 2-ethylhexyl acrylate, 32.2 g methyl methacrylate, 28.2 g acrylonitrile, 23.0 g the vinyl ester of neodecanoic acid, 3.8 g Sipomer B-CEA, 11.5 g acrylic acid 1.7 g N-(2-methacryloyloxyethyl) ethylene urea, and 0.69 g n-dodecyl mercaptan. Example 2a: 3 g sodium dioctyl sulfosuccinate and 15 g of Michem Prime 4990R were added under mixing to 300 g of the example 2. Example 2b: 3 g sodium dioctyl sulfosuccinate and 30 g of Michem Prime 4990R was added under mixing to 300 g of the example 2.

Example 3

Same as example 2 except the monomer mixture is changed to 53.6 g styrene, 53.6 g ethyl acrylate, 489.7 g 2-ethylhexyl acrylate, 28.2 g methyl methacrylate, 15.3 g acrylonitrile, 115.0 g the vinyl ester of neodecanoic acid, 3.8 g Sipomer B-CEA, 11.5 g acrylic acid 1.7 g N-(2-methacryloyloxyethyl) ethylene urea, and 0.69 g n-dodecyl mercaptan. Example 3a: 3 g sodium dioctyl sulfosuccinate and 15 g of Michem Prime 4990R were added under mixing to 300 g of the example 3.

The samples were tested by coating onto 2-mil PET film and drying at 110° C. for 5 minutes with a target dried adhesive coat weight of 21 g/m2. The coated PET was laminated to release liner. The PET/adhesive/liner construction was cut into 1-inch wide stripes, the release liner was removed, and the PET film with adhesive was laminated to stainless steel (SS) and high density polyethylene substrates (HDPE) for

I claim:

1. A pressure sensitive adhesive composition comprising about 79 to 99.5 wt %, of an acrylic polymer dispersion and about 0.5 to 21 wt %, of a polyolefin dispersion, with the wt % being based on the solids of the composition;
   wherein the acrylic polymer dispersion comprises one or more vinyl esters of $C_4$-$C_{12}$ carboxylic acids, and about 0.5 to about 5 wt % of one or more nitriles or amides of an ethylenically unsaturated carboxylic acids.

2. The pressure sensitive adhesive composition of claim 1 wherein the acrylic polymer dispersion comprises about 0.5 to about 20 wt % of one or more vinyl esters of a $C_4$-$C_{12}$ carboxylic acids, with the wt % based on the weight of the acrylic polymer dispersion.

3. The pressure sensitive adhesive composition of claim 1 wherein the one or more nitriles or amides of ethylenically unsaturated carboxylic acids is selected from acrylonitrile, alpha chloroacrylonitrile, methacrylonitrile and (meth)acrylamide.

4. The pressure sensitive adhesive composition of claim 1 wherein the polyolefin dispersion comprises one or more polyolefins which may or may not include acid functionality.

5. A pressure sensitive adhesive composition comprising about 79 to about 99.5 wt %, of an acrylic polymer dispersion and about 0.5 to 21 wt %, of a polyolefin dispersion, with the wt % being based on the solids of the composition,
   wherein the acrylic polymer dispersion comprises:
   i. about 75 to about 95 wt % of one or more acrylic acid ester or (meth) acrylate acid esters;
   ii. about 5 to about 10 wt % of one or more hydrocarbon monomers;
   iii. about 0.5 to about 3 wt % of one or more ethylenically unsaturated carboxylic acids;
   iv. about 0.5 to about 5 wt % of one or more nitriles or amides of an ethylenically unsaturated carboxylic acids;
   v. about 5 to about 20 wt % of one or more vinyl esters of $C_4$-$C_{12}$ carboxylic acids;

vi. optionally 0 to about 5 wt % of one or more nitrogen containing acetoacetoxy functional compounds; and
vii. optionally 0 to about 0.5 wt % of one or more mercaptan chain transfer agents;
with the wt % being based on the weight of components i-v;
and wherein the polyolefin dispersion comprises one or more polyolefins, which may or may not include acid functionality.

6. The pressure sensitive adhesive composition of claim 5 wherein the acrylic polymer dispersion comprises:
   i. one or more acrylic acid ester or (meth)acrylate acid esters selected from methyl acrylate, methyl methacrylate, ethyl acrylate, ethyl methacrylate, isopropyl acrylate, isopropyl methacrylate, n-butyl acrylate, n-butyl methacrylate, i-butyl acrylate, i-butyl methacrylate, t-butyl acrylate, t-butyl methacrylate, hexyl acrylate, hexyl methacrylate ethylhexyl acrylate, ethylhexyl methacrylate, 3,3 dimethylbutyl methacrylate and lauryl acrylate;
   ii. one or more hydrocarbon monomers selected from styrene, carboxylated styrene, alpha-methyl styrene, ethylene, propylene, butylene and conjugated dienes;
   iii. one or more ethylenically unsaturated carboxylic acids selected from acrylic acid, methacrylic acid, ethacrylic acid, crotonic acid, carboxyethyl acrylate, maleic acid, fumaric acid, itaconic acid, citraconic acid, aconitic acid, and including their halogen substituted derivatives and anydrides;
   iv. one or more nitriles or amides of an ethylenically unsaturated carboxylic acids selected from acrylonitrile, alpha chloroacrylonitrile and methacrylonitrile;
   v. one or more vinyl esters of a $C_4$-$C_{12}$ carboxylic acids;
   vi. optionally one or more nitrogen containing acetoacetoxy functional compounds; and
   vii. optionally one or more mercaptan chain transfer agents; with the wt % being based on the weight of components i-v;
   and wherein the polyolefin dispersion comprises one or more polyolefins including acid functionality.

7. The pressure sensitive adhesive composition of claim 5 wherein the acrylic polymer dispersion comprises:
   i. a combination of methyl methacrylate, ethyl acrylate, and ethylhexyl acrylate;
   ii. styrene;
   iii. a combination of acrylic acid and carboxyethyl acrylate;
   iv. acrylonitrile;
   v. one or more vinyl esters of a $C_9$ or $C_{10}$ carboxylic acids;
   vi. 0.5 to about 5 wt % of one or more nitrogen containing acetoacetoxy functional compound(s); and
   vii. 0.05 to about 0.5 wt % of one or more mercaptan chain transfer agents; with the wt % being based on the weight of components i-v;
   and wherein the polyolefin dispersion comprises one or more of polyolefins including acid functionality is selected from an ethylene acrylic acid copolymer and a propylene acrylic acid copolymer.

8. The pressure sensitive of claim 7 wherein the one or more nitrogen containing acetoacetoxy functional compounds is selected from t-butylaminoethyl methacrylate, dimethylaminoethyl methacrylate, diethyl-5 aminoethyl methacrylate, N,N-dimethylaminopropyl methacrylamide, 2-t-butylaminoethyl methacrylate, N,N-dimethylaminoethyl acrylate, N-(2-methacrylamido-ethyl)ethylene urea, and N-(2-methacryloyloxyethyl) ethylene urea.

9. The pressure sensitive adhesive of claim 5 wherein the one or more mercaptan chain transfer agents is a $C_6$-$C_{18}$ alkyl mercaptan.

10. A method of making a pressure sensitive adhesive composition comprising:
    combining about 79 to 99.5 wt %, of an acrylic polymer dispersion and about 0.5 to 21 wt %, of a polyolefin dispersion, with the wt % being based on the solids of the composition;
    wherein the acrylic polymer dispersion comprises one or more vinyl esters of a $c_4$-$C_{12}$ carboxylic acids, and about 0.5 to about 5 wt % of one or more nitriles or amides of an ethylenically unsaturated carboxylic acids.

11. The method of claim 10 wherein the acrylic polymer dispersion comprises about 0.5 to about 20 wt % of one or more vinyl esters of a $C_4$-$C_{12}$ carboxylic acids, with the wt % based on the weight of the acrylic polymer dispersion.

12. The method of claim 10 wherein the one or more nitriles or amides of ethylenically unsaturated carboxylic acids is selected from acrylonitrile, alpha chloroacrylonitrile, methacrylonitrile and (meth)acrylamide.

13. The method of claim 10 wherein the polyolefin dispersion comprises one or more polyolefins which may or may not include acid functionality.

14. A method of making a pressure sensitive adhesive composition comprising:
    combining about 79 to 99.5 wt %, of an acrylic polymer dispersion and about 0.5 to 21 wt %, of a polyolefin dispersion, with the wt % being based on the solids of the composition,
    wherein the acrylic polymer dispersion comprises:
    i. about 75 to about 95 wt % of one or more acrylic acid ester or (meth)acrylate acid esters;
    ii. about 5 to about 10 wt % of one or more hydrocarbon monomers;
    iii. about 0.5 to about 3 wt % of one or more ethylenically unsaturated carboxylic acids;
    iv. about 0.5 to about 5 wt % of one or more nitriles or amides of an ethylenically unsaturated carboxylic acids;
    v. about 5 to about 20 wt % of one or more vinyl esters of $C_4$-$C_{12}$ carboxylic acids;
    vi. optionally 0 to about 5 wt % of one or more nitrogen containing acetoacetoxy functional compounds; and
    vii. optionally 0 to about 0.5 wt % of one or more mercaptan chain transfer agents; with the wt % being based on the weight of components i-v;
    and wherein the polyolefin dispersion comprises one or more polyolefins, which may or may not include acid functionality.

15. The method of claim 14 wherein the acrylic polymer dispersion comprises:
    i. one or more acrylic acid ester or (meth)acrylate acid esters selected from methyl acrylate, methyl methacrylate, ethyl acrylate, ethyl methacrylate, isopropyl acrylate, isopropyl methacrylate, n-butyl acrylate, n-butyl methacrylate, i-butyl acrylate, i-butyl methacrylate, t-butyl acrylate, t-butyl methacrylate, hexyl acrylate, hexyl methacrylate ethylhexyl acrylate, ethylhexyl methacrylate, 3,3 dimethylbutyl methacrylate and lauryl acrylate;
    ii. one or more hydrocarbon monomers selected from styrene, carboxylated styrene, alpha-methyl styrene, ethylene, propylene, butylene and conjugated dienes;
    iii. one or more ethylenically unsaturated carboxylic acids selected from acrylic acid, methacrylic acid, ethacrylic acid, crotonic acid, carboxyethyl acrylate, maleic acid, fumaric acid, itaconic acid, citraconic acid, aconitic acid, and including their halogen substituted derivatives and anydrides;

iv. one or more nitriles or amides of an ethylenically unsaturated carboxylic acids selected from acrylonitrile, alpha chloroacrylonitrile and methacrylonitrile;

v. one or more vinyl esters of a $C_4$-$C_{12}$ carboxylic acids;

vi. optionally one or more nitrogen containing acetoacetoxy functional compounds; and vii. optionally one or more mercaptan chain transfer agents; with the wt % being based on the weight of components i-v;

and wherein the polyolefin dispersion comprises one or more polyolefins including acid functionality.

16. The method of claim 14 wherein the acrylic polymer dispersion comprises:

i. a combination of methyl methacrylate, ethyl acrylate, and ethylhexyl acrylate;

ii. styrene;

iii. a combination of acrylic acid and carboxyethyl acrylate;

iv. acrylonitrile;

v. one or more vinyl esters of a $C_9$ or $C_{10}$ carboxylic acids;

vi. 0.5 to about 5 wt % of one or more nitrogen containing acetoacetoxy functional compounds; and vii. 0.05 to about 0.5 wt % of one or more mercaptan chain transfer agents; with the wt % being based on the weight of components i-v;

and wherein the polyolefin dispersion comprises one or more of polyolefins including acid functionality is selected from an ethylene acrylic acid copolymer and a propylene acrylic acid copolymer.

17. The method of claim 16 wherein the one or more nitrogen containing acetoacetoxy functional compounds is selected from t-butylaminoethyl methacrylate, dimethylaminoethyl methacrylate, diethyl-5 aminoethyl methacrylate, N,N-dimethylaminopropyl methacrylamide, 2-t-butylaminoethyl methacrylate, N,N-dimethylaminoethyl acrylate, N-(2-methacrylamido-ethyl)ethylene urea, and N-(2-methacryloyloxyethyl)ethylene urea.

18. The method of claim 14 wherein the one or more mercaptan chain transfer agents is a $C_6$-$C_{18}$ alkyl mercaptan.

* * * * *